United States Patent [19]
Connell

[11] 3,915,502
[45] Oct. 28, 1975

[54] WHEEL COVER
[76] Inventor: James Connell, 5017 Dianna Drive, Bloomfield Hills, Mich. 48013
[22] Filed: Jan. 14, 1974
[21] Appl. No.: 432,981

[52] U.S. Cl............................. 301/37 R; 301/37 P
[51] Int. Cl.² ........................................... B60B 3/00
[58] Field of Search...301/37 P, 37 CM, 5 B, 63 PW, 301/63 R, 37 TP; D12/204, 213

[56] References Cited
UNITED STATES PATENTS
| | | | |
|---|---|---|---|
| 2,912,280 | 11/1959 | Lyon | 301/37 TP |
| 3,273,941 | 9/1966 | Skidmore | 301/5 B |
| 3,669,501 | 6/1972 | Derleth | 301/37 P |
| 3,671,076 | 6/1972 | Aske, Jr. | 301/37 P |

*Primary Examiner*—Lloyd L. King
*Assistant Examiner*—D. W. Keen
*Attorney, Agent, or Firm*—Harness, Dickey & Pierce

[57] ABSTRACT

One side of a double-coated adhesive tape is adhered to the inner face of a decorative plastic wheel cover, and the tape is located such that when the cover is applied to a conventional vehicle wheel the other side of the tape adheres to a central region of the wheel spider.

5 Claims, 3 Drawing Figures

U.S. Patent  Oct. 28, 1975  3,915,502
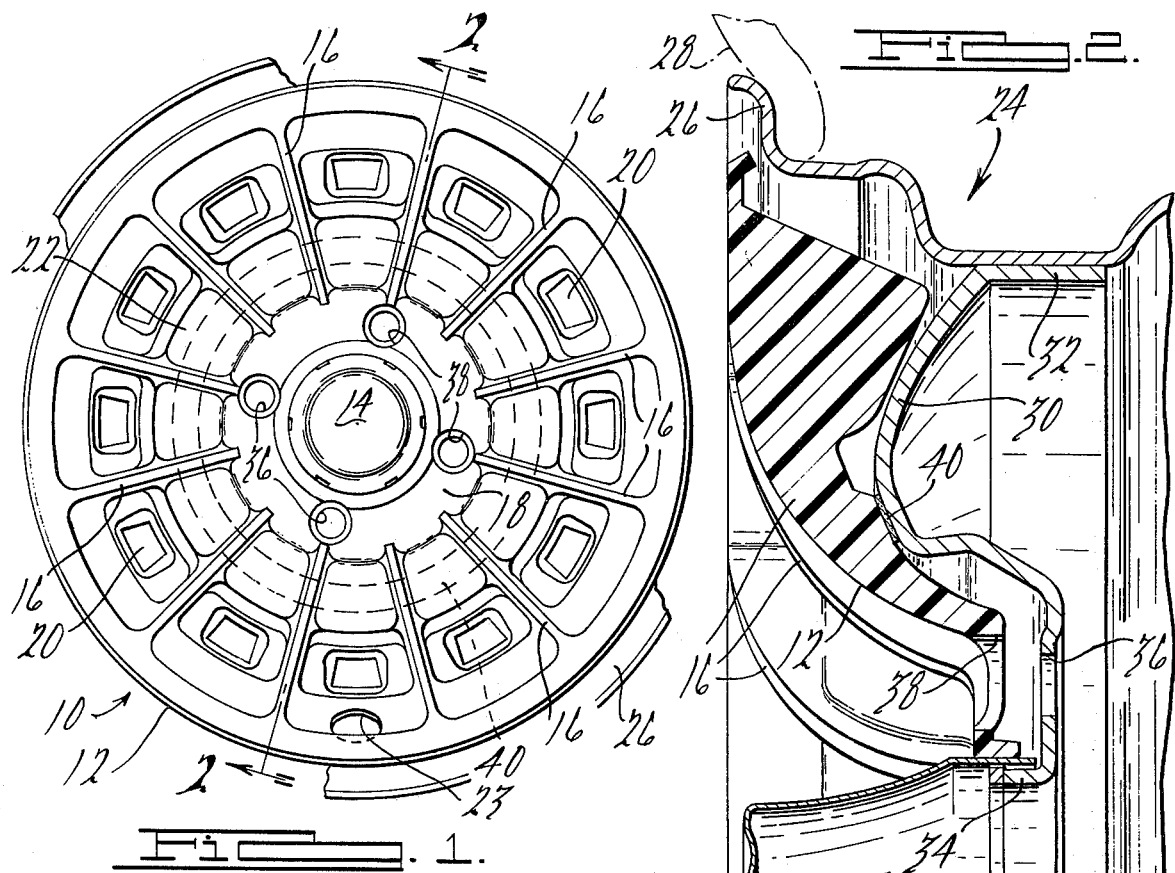
Fig. 1.
Fig. 2.
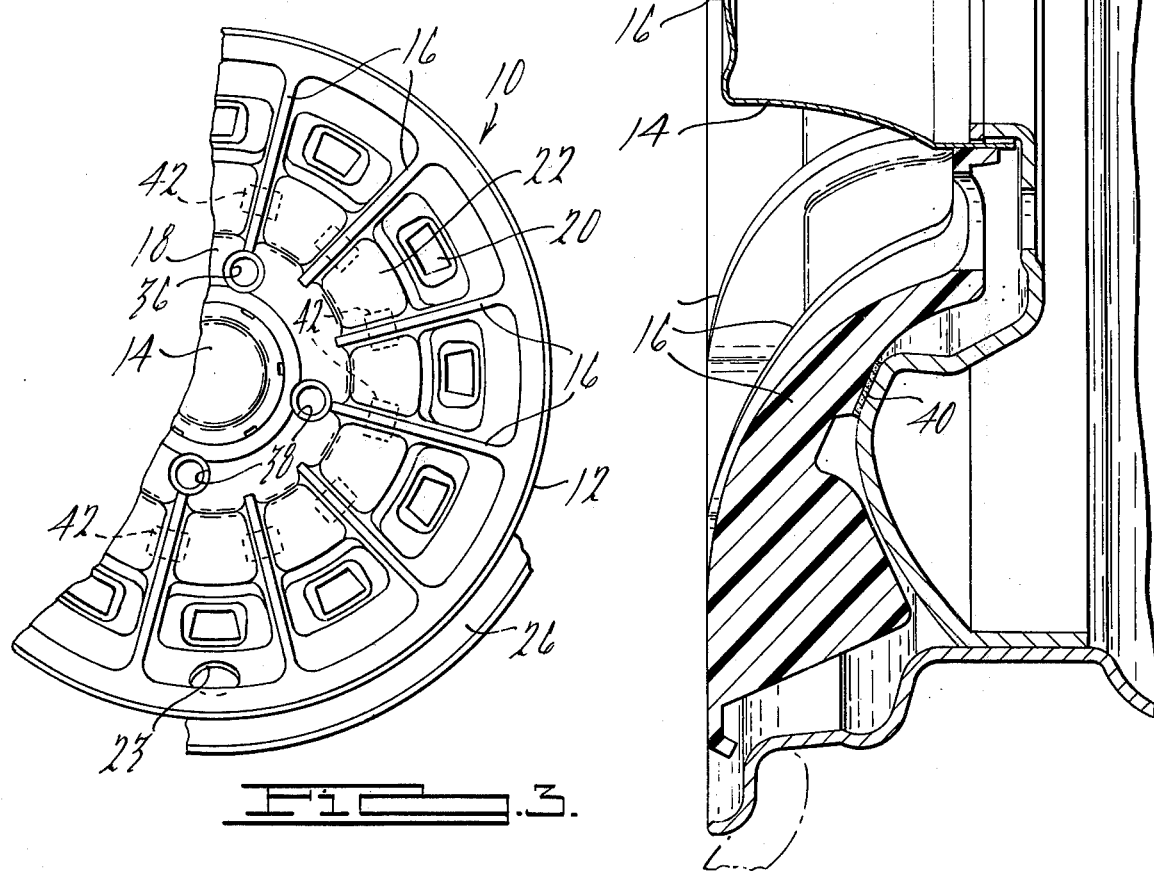
Fig. 3.

WHEEL COVER

BACKGROUND AND SUMMARY OF THE INVENTION

The present invention relates generally to vehicle wheel covers and particularly to an improvement in mounting wheel covers on vehicle wheels.

The prior art is replete with a myriad of means for mounting wheel covers on vehicle wheels. Included among these are resilient retention flanges and retention clips which are mechanically deflected upon application of the cover to the wheel to thereafter resiliently grab the wheel, usually the wheel rim. Since wheel covers of this type are intended to be removed from and reapplied to a wheel at times during use (for instance, when changing a tire), the retention structure must permit such removal and reapplication without undue difficulty and without self-inflicted damage; yet, the retention structure must also be able to adequately retain the cover on the vehicle wheel when the vehicle is in use. In view of these criteria, wheel trim retention structures currently used are generally extremely complicated involving, by way of example, multiply-flanged structures with and without integral retention teeth, complex clip shapes, etc.

The present invention is directed toward a novel wheel cover which does away with the foregoing retention techniques and arises in part through the recognition of certain phenomena which occur in a vehicle wheel during use. In general, today's typical automobile wheel is a two-piece article composed of a circular tire-receiving rim and a central spider, or disc, via which the wheel mounts to an axle of the automobile. Both the rim and the spider are typically made from steel with the rim being roll formed and the spider being stamped. The spider usually includes an outer peripheral flange via which the spider is secured to the rim, for instance, by welding. During use, the wheel is being continuously subjected to road forces tending to deform the rim from its initial circular shape. In addition to the circumferential deformation of the rim due to the normal component of vehicle load, severe road conditions, e.g., bumps, potholes, etc., can induce even more severe rim deformation. In spite of the severe loads to which a vehicle wheel is customarily subjected, it has been observed that the wheel spider experiences only a minimal amount of deformation, much less than that to which the rim is subjected. Accordingly, with the recognition of these phenomena, it has been discovered that ordinary double-coated adhesive tape can be successfully used to permanently mount a decorative wheel cover on a vehicle by so locating the adhesive tape on the wheel cover that the tape will adhere to the wheel spider when the cover is applied to a wheel. Even though double-coated tape has heretofore been used to mount wheel balancing weights at individual locations on a wheel, it has been found by virtue of the present invention that a substantially full wheel cover can be permanently retained on the outer face of a wheel even though the rim of the wheel may be substantially deformed from its circular shape during use. Hence, with the present invention, the complicated retention structures known to the prior art can be dispensed with. Moreover, the use of a tape having a resilient body is especially beneficial since maximum adherence can be attained in spite of any surface imperfection in the wheel or cover, and a certain cushioning effect is attained.

An important advantage of the present invention is that the costs associated with the manufacture and assembly of wheel covers can be minimized. Furthermore, maximum benefit can be taken of the especially durable characteristics of plastic wheel covers. Since many current plastic wheel covers are highly impervious to marring, denting, or other types of damage when in use, there is no need to require that the wheel cover be removable from and reappliable to a wheel. Hence, permanent mounting as achieved through the present invention is especially desirable. Importantly, there arises the added advantage of minimizing the work involved when it is necessary to change a tire since removal and reapplication of a wheel cover is totally unnecessary.

Additional features and advantages of the invention, along with those already enumerated, will be seen in the ensuing description and claims which are to be taken in conjunction with the accompanying drawing. The drawing illustrates a preferred embodiment of the invention in accordance with the best mode presently contemplated for carrying out the invention.

BRIEF DESCRIPTION OF THE DRAWING

FIG. 1 is a front view of the axially outer face of a wheel cover embodying principles of the present invention.

FIG. 2 is an enlarged sectional view taken in the direction of arrows 2—2 in FIG. 1 and including a fragmentary sectional view of a vehicle wheel on which the wheel cover mounts.

FIG. 3 is a fragmentary view of a further embodiment.

DESCRIPTION OF THE PREFERRED EMBODIMENT

In the drawing, a decorative wheel cover assembly 10 is illustratively shown as comprising a decorative molded plastic annular wheel cover element 12 and a decorative metal hubcap element 14 affixed to the center of cover element 12. It will be appreciated, however, that the illustrated cover shape and type is merely exemplary and that the principles of the invention are applicable to other shapes and types of wheel covers. Plastic cover element 12 may be constructed using known techniques from any of the commonly known materials. The plastic may be colored or otherwise ornamented and decorated in accordance with styling considerations. The illustrated cover element 12 includes a plurality of radially directed ribs 16 which extend radially inwardly from substantially the outer perimeter of the cover to a location spaced outwardly of cap 14 leaving a flat annular region 18 at the inner periphery of element 12. A plurality of recessed ventilating holes 20 are arranged in a circle around element 12 with each ventilating hole being located between immediately adjacent ribs 16. A series of decorative pads 22 are arranged in a circle interiorly of ventilating holes 20. A valve stem hole 23 is also provided in cover element 12.

Cover assembly 10 in FIG. 2 is shown mounted on a conventional steel, two-piece automobile wheel 24 which has a multiflanged annular rim 26 for receiving a pneumatic tire 28 and a wheel spider, or wheel disc, 30. Spider 30 includes an outer axial terminal flange 32 which fits snugly within the inner periphery of rim 26 and is securely affixed thereto, for example, by welding or other suitable assembly techniques. Spider 30 terminates at an inner axial flange 34 which fits over the wheel mounting hub on the vehicle axle. A plurality of four attachment holes 36 are arranged 90° apart around the wheel immediately outwardly of inner flange 34. Matching clearance holes 38 are provided in cover element 12. Wheel 24 is secured to an axle via holes 36; for example, studs on the axle can pass through holes 36, 38, and wheel nuts can be threaded onto the studs to secure the wheel spider to the axle.

In accordance with principles of the present invention, a double-coated adhesive tape 40 serves to mount wheel cover 10 to wheel 24. Tape 40 preferably includes a resilient body with adhesive applied to opposite sides thereof. By way of example, suitable tape is Minnesota Mining & Manufacturing Company "Scotchfoam" and "Scotchmount," although it will be appreciated that other comparable double-coated tapes may be used. Preferably, the tape body has a thickness on the order of 1/32 inch to 1/16 inch and is on the order of a half inch wide. The tape is also capable of functioning over the customary temperature extremes to which the automobile wheel is typically subjected; by way of example, minus 40° F. to 180° F. As shown in the drawing, tape 40 is of circular shape, having a diameter equal to approximately half the overall diameter of the wheel cover assembly and being located radially approximately midway between the center and the perimeter of the wheel cover assembly. The tape of this particular shape, by way of example, could be die cut from stock which includes a layer of paper or other material covering the adhesive surfaces thereof. The paper on one side of the tape may be stripped to permit the tape to be applied to the cover. When it is desired to mount the cover to the wheel, the other strip of paper may be removed to expose the adhesive surface of the tape which is to be adhered to the wheel. Preferably, tape 40 is so located to adhere to a portion of the spider which extends generally radially of the wheel, as in the illustrated embodiment. Thus, with the wheel in use, wheel cover 10 is securely retained on the wheel with the present invention even though rim 24 is subjected to severe deformation, especially the outer portions thereof. Retention arrangements which grab the tire rim and are susceptible to falling off the rim due to excessive deformation thereof are entirely eliminated by the present invention. With the present invention, the complexity of a wheel cover is greatly reduced, and full advantage can be taken of currently available decorative plastic covers which are highly immune and resistant to damage, both functionally and appearance-wise. Although tape 40 permanently mounts the wheel cover to the wheel, the clearance holes provided in the cover permit the wheel to be removed from the vehicle without the need to remove the cover from the wheel. Use of a tape having a resilient body is beneficial in that better adherence to the cover and wheel is attained to provide maximum adhesive contact even over surface imperfections and irregularities, and in use a certain resiliency to the mounting is attained which is beneficial in providing a cushioning effect whereby retention is further enhanced. Hence, the present invention offers significant advantages over the prior art.

Alternatively, it is contemplated that other configurations of double-coated adhesive tape 40 could be used. For example, as shown in FIG. 3, a plurality of individual pieces 42 of tape could be located at selected locations around the wheel cover for adherence to the wheel spider. These individual sections are preferably located directly behind relatively thick portions of the wheel cover; for example, these could be located in a circular pattern on the illustrated cover behind each of the ribs 16 and at a similar radial location to that shown.

While it will be apparent that the preferred embodiment of the invention disclosed is well calculated to fulfill the objects above stated, it will be appreciated that the invention is susceptible to modification, variation, and change without departing from the spirit thereof.

What is claimed is:

1. In combination: a vehicle wheel comprising a rim and a spider; a decorative wheel cover disposed on the axially outer face of the wheel in axially spaced relation thereto; and means mounting the wheel cover on the wheel comprising a double-coated tape having a resilient body and adhesive on opposite sides thereof, said tape being located to mount the wheel cover to the spider portion only of the wheel with one side of the tape being adhered to the wheel cover and the other side of the tape to the wheel spider wherein said tape is located to adhere to a generally radially extending portion of the wheel spider, whereby the rim of the wheel is free to deflect radially relative to said spider without transferring stress to said wheel cover.

2. The combination of claim 1 wherein said tape is located on the wheel cover at a radial location approximately midway between the center and the perimeter thereof.

3. The combination of claim 1 wherein said generally radially extending portion of the wheel spider is circumferentially continuous and said tape is also circumferentially continuous.

4. The combination of claim 1 wherein said wheel cover comprises a plastic.

5. The combination of claim 1 wherein said tape comprises a plurality of individual pieces disposed at selected circumferentially spaced locations on said wheel cover.

* * * * *